L. C. REESE.
MACHINE FOR MOLDING DOUGH AND THE LIKE.
APPLICATION FILED OCT. 2, 1915.

1,226,248.

Patented May 15, 1917.
8 SHEETS—SHEET 1.

WITNESSES:

INVENTOR.
Louis Charles Reese,

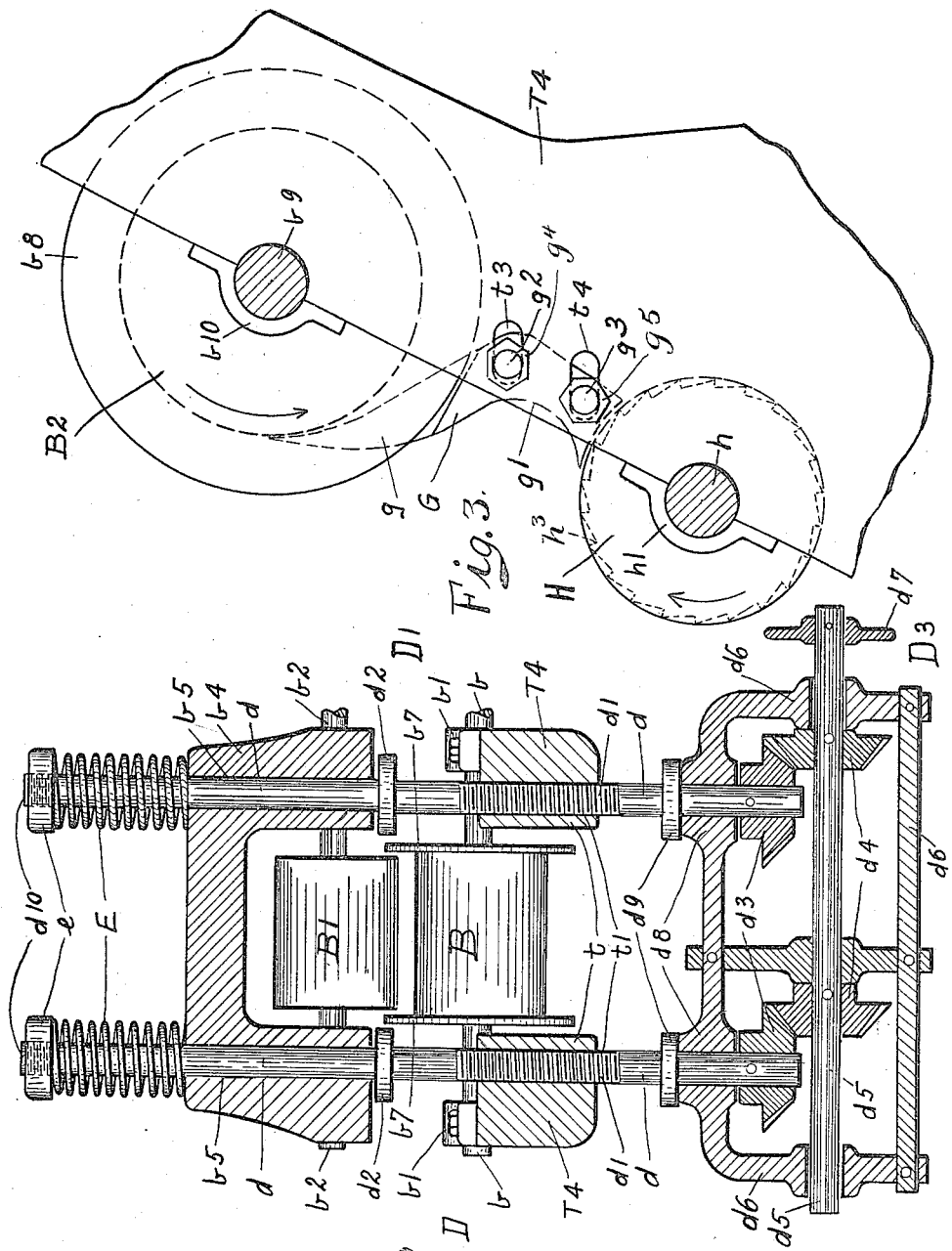

L. C. REESE.
MACHINE FOR MOLDING DOUGH AND THE LIKE.
APPLICATION FILED OCT. 2, 1915.

1,226,248.

Patented May 15, 1917.
8 SHEETS—SHEET 3.

WITNESSES:

INVENTOR.
Louis Charles Reese,

L. C. REESE.
MACHINE FOR MOLDING DOUGH AND THE LIKE.
APPLICATION FILED OCT. 2, 1915.

1,226,248.

Patented May 15, 1917.
8 SHEETS—SHEET 4.

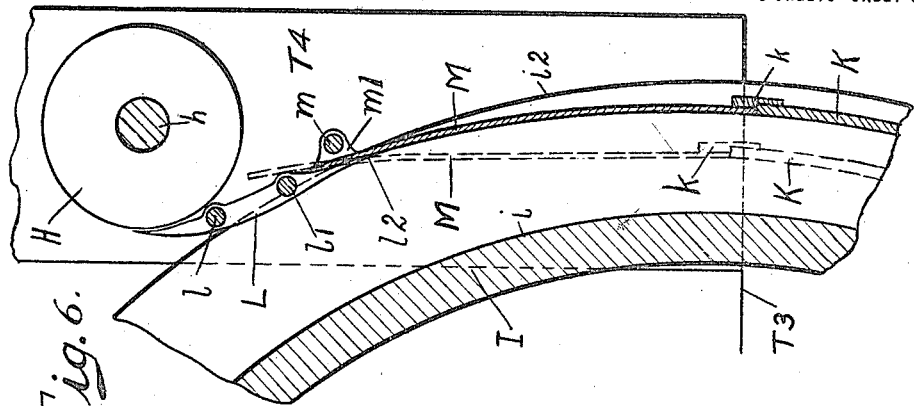
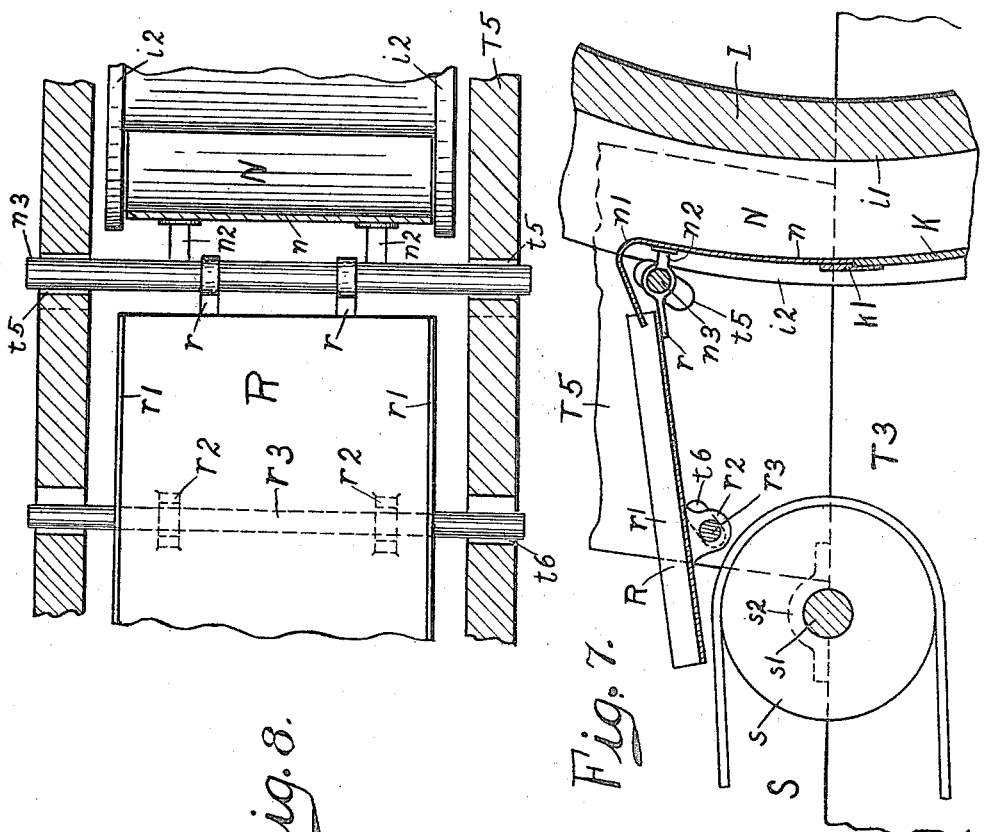

L. C. REESE.
MACHINE FOR MOLDING DOUGH AND THE LIKE.
APPLICATION FILED OCT. 2, 1915.
1,226,248.
Patented May 15, 1917.
8 SHEETS—SHEET 6.
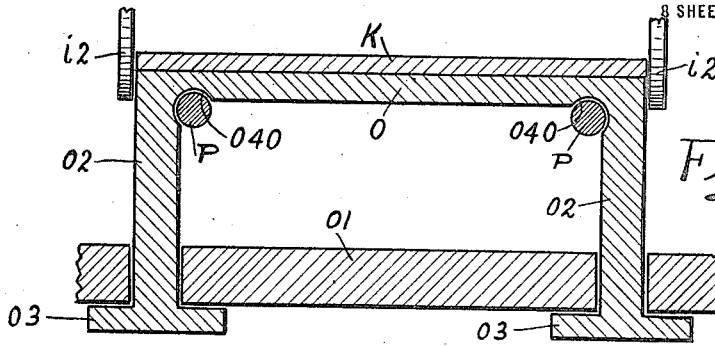
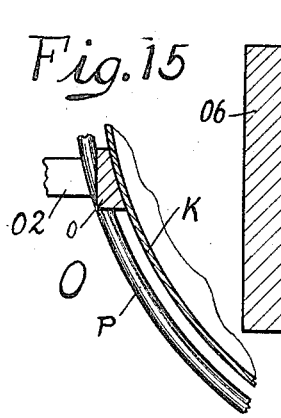
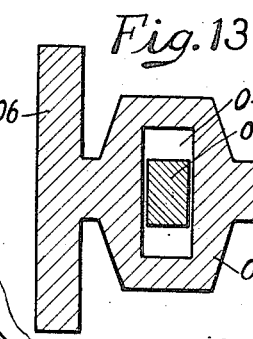
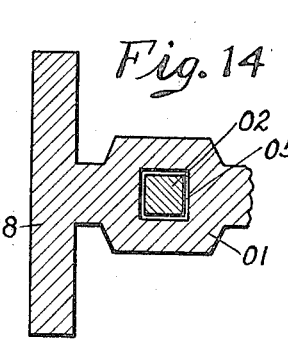
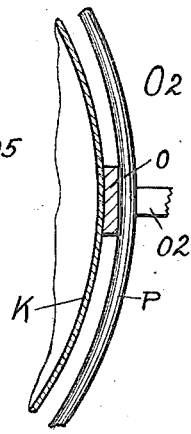
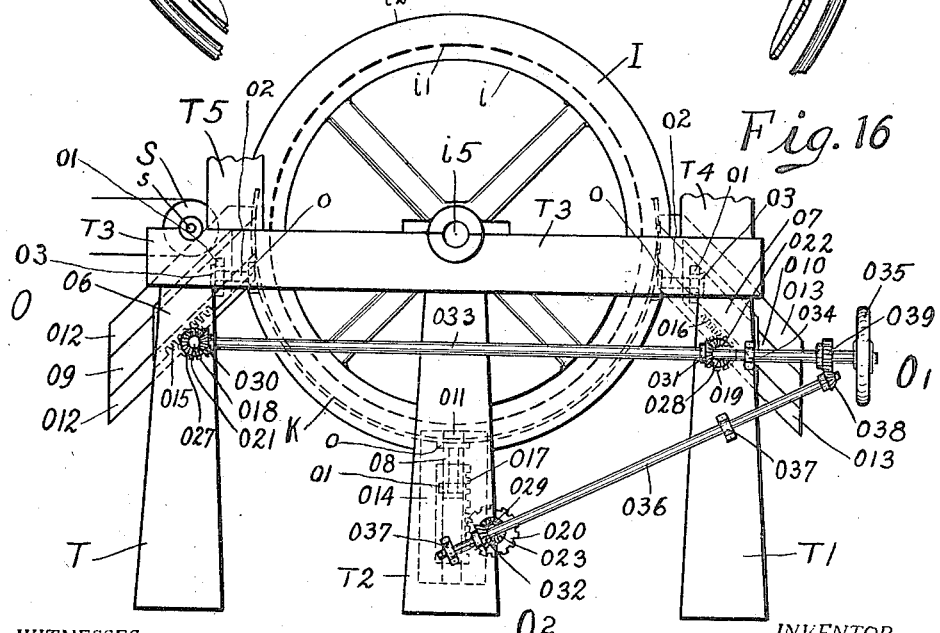
WITNESSES:
J. Ray Abbey
M. L. Johnston
INVENTOR.
Louis Charles Reese L. C. REESE.
MACHINE FOR MOLDING DOUGH AND THE LIKE.
APPLICATION FILED OCT. 2, 1915.
1,226,248.
Patented May 15, 1917.
8 SHEETS—SHEET 7.
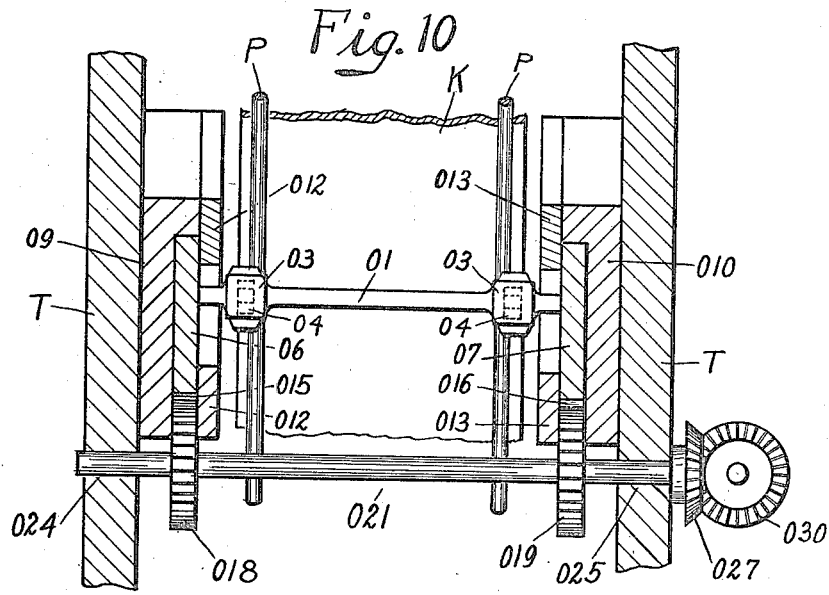
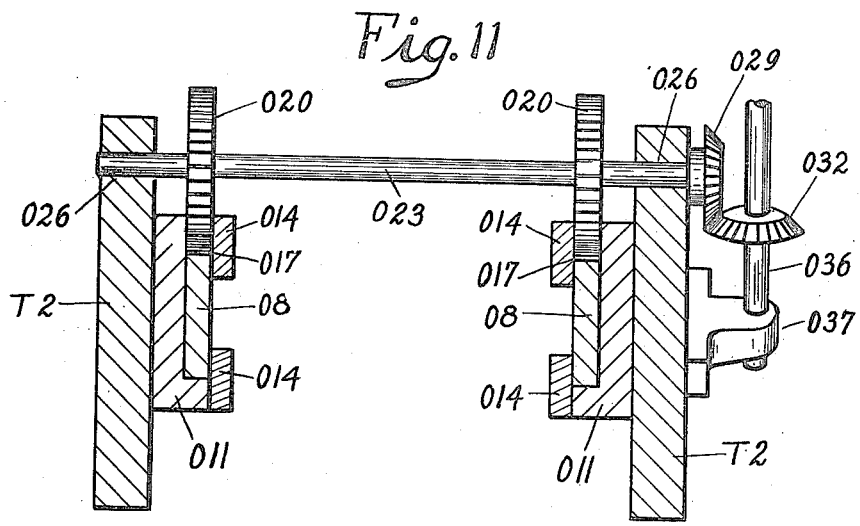
WITNESSES:
J. Ray Abbey
M. L. Johnston
INVENTOR.
Louis Charles Reese,

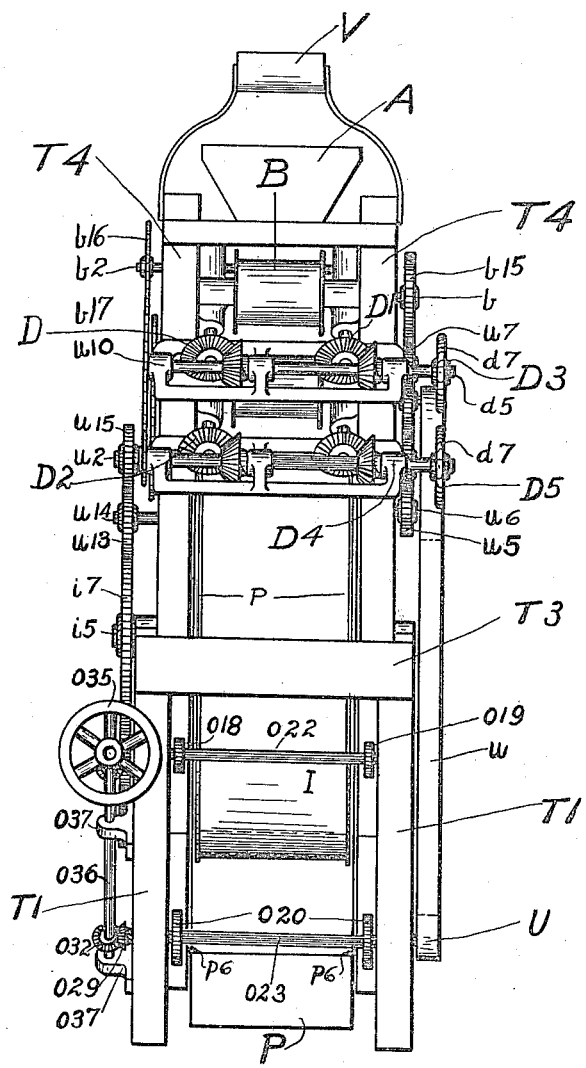

UNITED STATES PATENT OFFICE.

LOUIS CHARLES REESE, OF SAGINAW, MICHIGAN, ASSIGNOR TO WERNER & PFLEIDERER CO., OF SAGINAW, MICHIGAN.

MACHINE FOR MOLDING DOUGH AND THE LIKE.

1,226,248.    Specification of Letters Patent.    Patented May 15, 1917.

Application filed October 2, 1915. Serial No. 53,842.

*To all whom it may concern:*

Be it known that I, LOUIS CHARLES REESE, a resident of Saginaw, in the county of Saginaw and State of Michigan, have invented new and useful Improvements in Machines for Molding Dough and the like, of which the following is a specification.

This invention relates to improvements in machines for sheeting, rolling and finally forming pieces of dough into the required shape, ready for the oven; and its object is to accomplish this result in a more efficient and perfect manner than was hitherto possible in this kind of machines.

I attain these objects by a number of novel and improved devices, mechanisms, arrangements and combinations of parts all of which are fully described on hand of the accompanying drawings specifically produced and in the appended claims.

The main feature of my invention is that in those parts of the machine in which the dough is subjected to considerable pressure, namely in the dough sheeting and loaf forming operation, I make the parts producing the pressure not only adjustable in regard to their distance from each other, but also resilient by simple devices, adapted to regulate the resiliency according to the nature of the dough. In the machines of this kind hitherto constructed the openings through which the pieces of dough are pressed, are in most cases made adjustable, but not resilient, so that the dough is forced through without any chance of redress in case the openings should not be in accordance with the nature of the dough. The consequence is that in such cases the whole quantity or larger portion of the carbonic acid-gas which has been formed in the dough by means of the tedious and costly process of fermentation in order to obtain a light and spongy loaf, is forcibly driven out and must be reproduced therein, before it can be put into the baking oven. In my machine on the contrary, in which in consequence of its resilient devices the dough is not exposed to such a severe treatment, the carbonic acid-gas contained in same is completely or for the most part retained, and thus a great saving in time and in raw material by the decomposition of which the carbonic acid gas is formed, is effected.

The drawings represent, as example of the application of the invention, a machine for molding bread dough into thin loaves, but—of course—it will be understood that I do not wish to be limited to this machine specifically, as the invention may be readily adapted and employed with the greatest ease in other machines for molding dough or other plastic material into other shapes and forms.

Fig. 2 is a cross-section of the device for the adjustment and resiliency of each upper roller of the sheeting apparatus.

Fig. 3 represents the dough folding apparatus.

Fig. 6 is a section through the arrangement of the inlet and Fig. 7 of the outlet of the loaf-forming apparatus.

Fig. 8 is a plan of the latter arrangement.

Fig. 9 is a side elevation of the loaf forming apparatus itself and of the frame work carrying same showing the rack arrangement for adjusting the distance between the bottom plate and the face of the reel.

Fig. 10 is a vertical cross-section of the side-adjustment and Fig. 11 a cross-sectional plan of the bottom-adjustment of the bottom plate.

Fig. 12 is an enlarged section of the bearer bars and guide-blocks of the adjustment of the bottom plate.

Fig. 13 is a section vertical to that of Fig. 12 through the side bearer bars and guide-blocks, and Fig. 14 is the same section through the bottom bearer bars and guide-blocks.

Fig. 15 shows the arrangement of the side guide-blocks, and Fig. 16 that of the bottom guide-blocks of the bottom plate.

Fig. 17 is an end elevation of the machine.

Like letters and like letters with like numerals added thereto indicate like parts in all figures.

Figure 1:
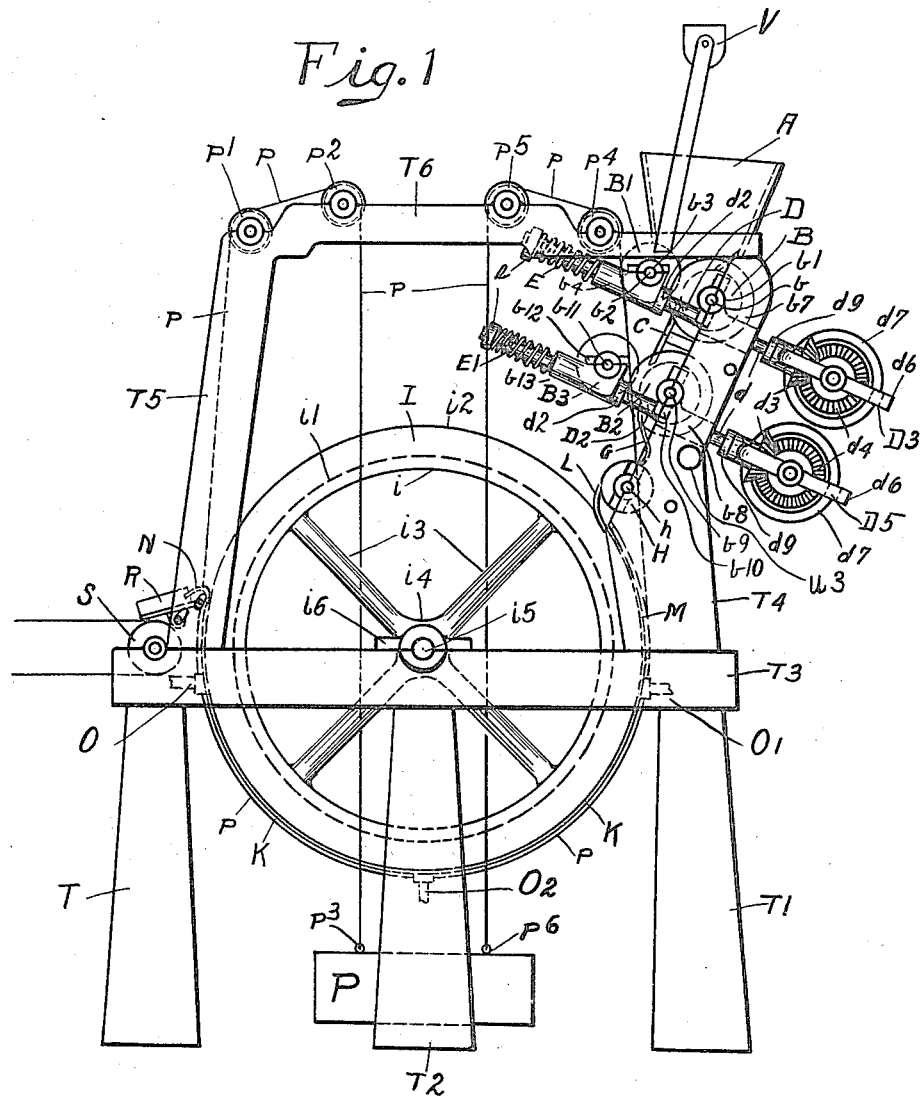
Figure 1 is a side elevation of the machine showing its various parts and their general arrangement, the upper rollers of the dough sheeting apparatus being made resilient by spring devices, and the bottom-plate of the loaf forming part of the machine by means of a weight appliance.

A is a hopper for feeding the machine.

B, $B_1$, $B_2$ and $B_3$ are the brake rollers, between which the dough is rolled out to a sheet, and which, together with the bridge-plate C, form the sheeting apparatus of the machine. B and $B_1$ are called the upper pair, and $B_2$ and $B_3$ the lower pair of rollers. $B_1$ and $B_3$ form the top and B and $B_2$, the bottom rollers. All rollers are rotated in the direction of the dough, that is, downward; therefore B and $B_2$ revolve in opposite direction to $B_1$ and $B_3$. The bottom rollers are provided at their sides with guide plates, which, together with the guide bridge C, lead the dough from the upper pair to the lower pair of rollers and then to the folding apparatus of the machine.

D, $D_1$ and $D_2$ and $D_4$ are the devices for adjusting the distance between the top and bottom rollers, D and $D_1$ serving for the upper, and $D_2$ and $D_4$ for the lower pair of rollers.

These devices consist of guide rods arranged at each side of the upper and lower pair of rollers vertically to the sheet of dough and provided with stops on which the guide blocks of the upper rollers rest, and with screw threads turning in the female threads of screw blocks fixed to or part of projections of the stationary frame work supporting the machines.

The pair of guide rods, D and $D_1$, are turned simultaneously by the bevel gearing $D_3$, and $D_2$ and $D_4$ by $D_5$. In this way, as all the screw threads and bevel wheels are the same, the rods with their stops and thereby the upper rollers are moved to the same degree upward or downward according to the direction in which the bevel-gearing belonging thereto is turned. The guide blocks of the upper rollers are held in position on the stops of the guide rods belonging thereto by springs.

The springs E hold down the top roller $B_1$ (Fig. 1 and Fig. 2), and the springs $E_1$ the top roller $B_3$. The degree of resiliency can be changed by shortening or lengthening these springs. The completely sheeted piece of dough passes gradually, as it leaves the sheeting rollers, to the folding apparatus in order to be formed into a roll. The sheet of dough moves, guided by the upper convex part of the folding member G onto the folding roller H which, revolving toward the surface of G, throws the dough against the concavity of the curved lower part of G whereby the dough sheet is rolled up. The folding member is preferably made adjustable in order to regulate the position of the member in regard to the folding roller H in accordance with the size of the piece of dough to be worked and of the roll to be produced therefrom. The roll of dough is then definitely formed into the required loaf shape in the molding channel formed by the face and sides of the rotating reel I and the stationary, adjustable bottom plate K with the fixed inlet plate L and the adjustable intermediate plate M at the inlet side, and with the adjustable outlet plate N at the outlet side of the channel.

In order to regulate the size and shape of the cross-section of the above described molding channel according to the weight, volume, density and resiliency of the roll of dough to be formed to loaves therein, the bottom plate K is provided with the rack devices O, $O_1$ and $O_2$.

When ready adjusted, the bottom plate K is kept in its position by a weight arrangement P (Fig. 1). The resiliency of the bottom plate thus obtained can be regulated by adjusting the weight employed.

R is the chute leading the completely molded loaf of dough from the outlet N of the molding channel to the belt conveyer S carrying it to its destination.

In the framework of the machine, T, $T_1$ and $T_2$ indicate the three pairs of legs of the machine carrying at their inner sides the racks of the bottom plate adjustment and at the top the horizontal main frame $T_3$. The latter supports the axle of the molding reel I, that of the roller for the belt conveyer S, and the side structures $T_4$ and $T_5$.

$T_4$ carries the hopper A at its top, below same the whole sheeting apparatus, then the folding member G, the axle of the folding roller H, the driving gear of the machine and the inlet plate L.

$T_5$ serves as support for the outlet plate N and the chute R.

For supporting the grooved pulleys for the rope carrying the weight P to travel over the side structure $T_5$ is prolonged, and a crosspiece $T_6$ provided, connecting the upper parts of $T_4$ and $T_5$.

U is the electric motor for driving the gearing of the machine.

V represents a flour sprinkler of ordinary construction for dusting the dough when entering the machine.

I am now going to describe the various parts of the machine, their connection with and position toward each other in a more detailed manner.

The hopper A is so constructed and arranged at the top of the framework $T_4$ that the dough pieces dropped thereon slip easily without the slightest hindrance between the rollers B and $B_1$. In the devices D and $D_1$ Fig. 2, for adjusting the distance between the rollers B and $B_1$, the guide rods $d$ are provided with the screw threads $d_1$ and held by and turning in the female threads $t_1$ of the projections $t$ on the inner sides of the frame $T_4$. The shaft $b$ of the roller B is carried by the bearings $b_1$ arranged on the stationary frame $T_4$, and the shaft $b_2$ of the roller B, rotates in bearings $b_3$ provided in the block $b_4$ sliding on the guides $d$ by means of the channels $b_5$ arranged in the block $b_4$ and exactly fitting to the rods $d$. The latter are provided with the stops $d_2$ to carry the movable block $b_4$ and turned by the bevel gearing $D_3$. The latter consists of the bevel wheels $d_3$ fixed to the end of the guide rods $d$ below the screw threads $d_1$ and engaging with the bevel wheels $d_4$ fixed to the shaft $d_5$ turnable in the frame $d_6$ by means of the hand wheel $d_7$. The frame $d_6$ is provided with the bearings $d_8$ arranged between the bevel wheels $d_3$ and the stops $d_9$ attached to the guide rods $d$, so that, when the hand wheel $d_7$ is turned, the bevel wheels $d_4$ fixed to the shaft $d_5$ remain in gearing with the bevel wheels $d_3$ fixed to the guide rods $d$, the frame $d_6$ being held in position by the bearings $d_8$. Thus, the guide rods $d$ are simultaneously turned in the latter and moved up and down by means of the screw threads $d_1$ and $t_1$, lifting or lowering the block $b_4$ carrying the upper roller $B_1$ at both ends at the same time and to the same degree.

The blocks $b_4$ carrying the upper rollers are kept in their position on the stops $d_2$ according to Fig. 1 and Fig. 2 by means of the springs $E$ and $E_1$, the tension of which can be adjusted by means of the screw nuts $e$ turning around screw threads $d_{10}$ arranged at the upper part of the guide rods $d$.

The rollers $B$ and $B_2$ are provided at their sides with the circular plates $b_7$, respectively $b_8$, reaching over the lower part of the rollers $B_1$, respectively $B_3$, so as not to allow the sheet of dough to become broader than the rollers.

The lower pair of rollers $B_2$ and $B_3$ are equipped with the adjusting devices $D_2$ and $D_4$ and the springs $E_1$, all of which appliances are constructed in their details and work exactly as those employed for the upper pair of rollers $B$ and $B_1$.

The straight steel plate $C$ (Fig. 1) is fixed to the framework $T_4$ of the machine and constructed of such a shape as to lead the dough treated in the rollers $B$ and $B_1$ from between the side plates $b_7$ to the rollers $B_2$ and $B_3$ in between the side plates $b_8$ of the roller $B_2$.

The shaft $b_9$ of the roller $B_2$ turns in the bearing $b_{10}$ (Fig. 1) arranged at the stationary framework $T_4$, and the shaft $b_{11}$ of the roller $B_3$ in the bearings $b_{12}$ carried by the movable block $b_{13}$ sliding on the guide rods of the adjusting devices $D_2$ and $D_4$.

The upper part $g$ of the folding member $G$ is shaped to receive the dough from between the rollers $B_2$ and $B_3$ and must therefore fit between the side plates $b_8$ of the roller $B_2$, while the lower curved part $g_1$ of $G$ has the width of the folding roller $H$.

The folding member $G$ is attached to the frame $T_4$ by means of the screw studs $g_2$ and $g_3$ provided at each side of $G$. For adjusting the position of $G$, the slides $t_3$ and $t_4$ are provided at each side of the frame $T_4$ for the studs $g_2$ and $g_3$.

In order to fix the plate $G$ in its adjusted position, it is clamped to the supports $T_4$ by any known means, for instance, as indicated in Fig. 3, by screw nuts, $g_4$ and $g_5$, fitting over the threaded ends of the studs $g_2$, respectively $g_3$, protruding outside the supports $T_4$, and pressing against same.

The folding roller $H$ has preferably a corrugated surface, these corrugations consisting for instance of toothlike recesses as shown in Fig. 3, and its shaft $h$ turns in bearings $h_1$ arranged on the framework $T_4$.

The roller $H$ is arranged parallel to and underneath the sheeting rollers $B_2$ and $B_3$ at such a point that the ready sheet of dough leaving these rollers drops on the folding roller $H$ just above its center. As soon as the dough touches the roller $H$ which rotates quicker than the rollers $B_2$ and $B_3$, it is caught up by $H$ and thrown into the concavity formed by the concave part $g_1$ of the folding member $G$ toward which the roller $H$ revolves. This concavity is so constructed and arranged in regard to the rollers $H$ and $B_2$, that those parts of the dough sheet coming from the roller $H$ glide at first upward on the surface of the concave part $g_1$, turn sidewise at its upper part and drop then downward by their own gravity. These parts of the dough sheet meet thus the parts subsequently arriving from the roller $H$ and roll themselves up with same. The rolled-up parts are held in their place between the concave part $g_1$ of the member $G$ and the top of the roller $H$ by the fresh parts of the dough sheet passing downward from between the sheeting rollers $B_2$ and $B_3$ toward the folding roller $H$ and kept in tension by the latter revolving quicker than the former. The size of the cross section of the space between the concave part $g_1$ of the member $G$ and the dough sheet passing down from the sheeting rollers onto the center of the folding roller $H$ is about half that of the cross section of the finished cylindrical roll obtainable from the dough sheet prepared in the sheeting apparatus, and is adjusted according to the quantity of dough used for each sheet and the size of the sheets made, by adjusting the position of the member $G$ in the manner described above. As soon as the last part of the dough sheet has left the sheeting rollers $B_2$ and $B_3$, the tension on the dough roll forming in the concavity of the folding member $G$ ceases, and the now completely finished roll drops by its own gravity over the opposite side of the roller $H$ onto the inlet-plate $L$ of the molding channel and thus into the latter.

The electric motor $U$ drives by means of the belt $u$ the main driving pulley $u_1$ fixed to the main shaft $u_2$ rotating in bearings $u_3$ arranged in the framework $T_4$. (Figs. 1, 4 and 5.)

Figure 4:
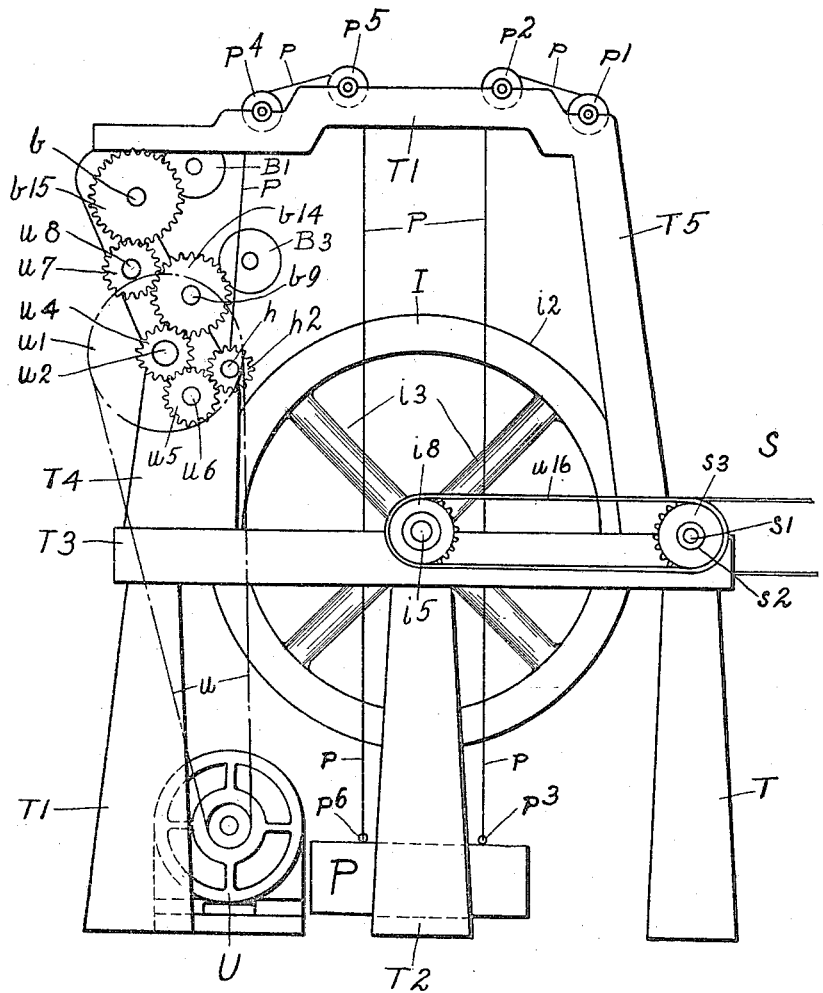
Fig. 4 and Fig. 5 are opposite elevations showing the driving arrangement and gearing of the machine at both sides.
Figure 5:
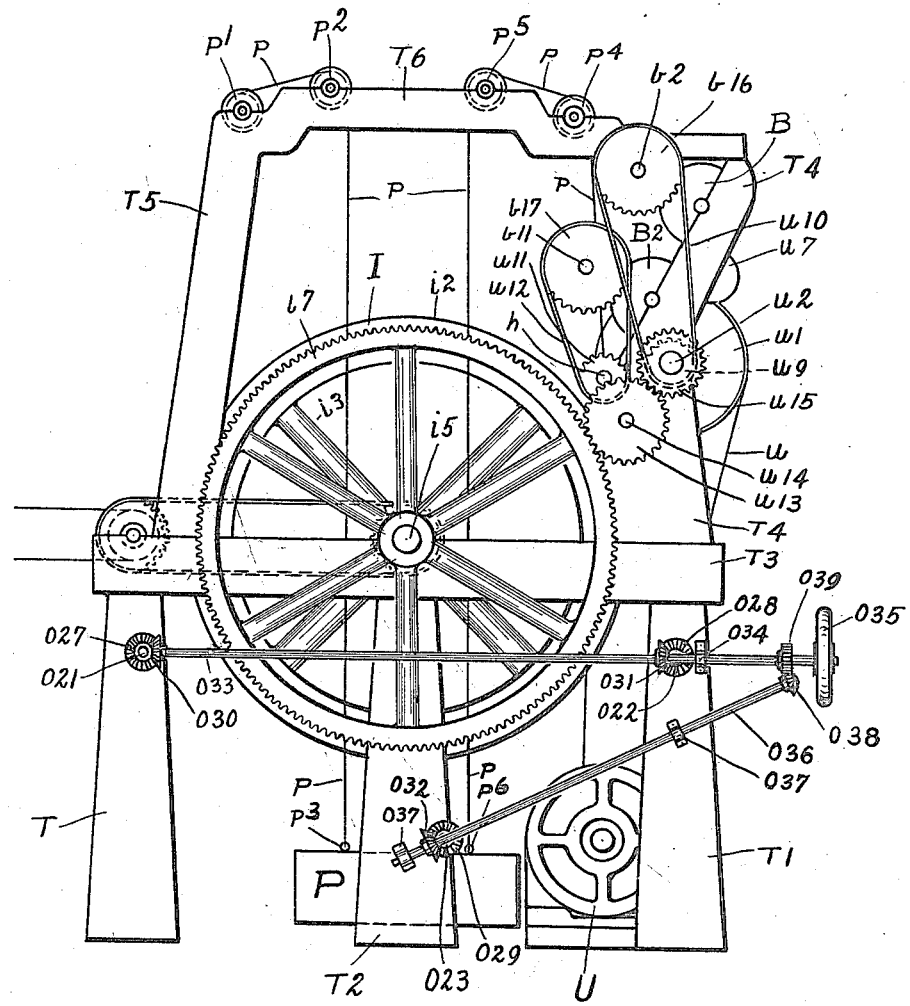

On that end which carries the driving pulley $u_1$ Fig. 4, the driving shaft $u_2$ is provided with the gear wheel $u_4$ which meshes with the gear wheel $b_{14}$ fixed to the shaft $b_9$ of the roller $B_2$ which is thus rotated; $u_4$ also meshes with the idler $u_5$ rotating around the lug $u_6$ arranged at the framework $T_4$, and meshing with the gear wheel $h_2$ fixed to the shaft $h$, and thus drives the roller H. The gear wheel $b_{14}$ meshes with the idler $u_7$ rotating around the lug $u_8$ fixed to the framework $T_4$, and, meshing with the gear wheel $b_{15}$ arranged at the shaft $b$ drives the roller B.

In Fig. 4 the gear wheel $h_2$ driving the folding roller H is shown as having half the size of the gear wheel $b_{14}$ driving the sheeting roller $B_2$, and, both being driven—$b_{14}$ directly and $h_2$ through the idler $u_5$—by means of the gear wheel $u_4$ fixed to the main driving shaft $u_2$ of the machine, the roller H rotates with double the velocity as the roller $B_2$.

On the opposite side of the driving pulley $u_1$ (Fig. 5) the driving shaft $u_2$ carries the sprocket wheel $u_9$ which by means of the chain $u_{10}$ drives the sprocket wheel $b_{16}$ attached to the shaft $b_2$, and thus the roller $B_1$, and the driving shaft $h$ of the folding roller H carries the sprocket wheel $u_{11}$ which by means of the chain $u_{12}$ drives the sprocket wheel $b_{17}$ fixed to the shaft $b_{11}$ and thereby the roller $B_3$.

The reel I consists of the ring $i$ the face of which is indicated by the letter $i_1$, and the two sides $i_2$ of the rim. The ring $i$ is supported by the spokes $i_3$ and the crown $i_4$ fixed on the axle $i_5$ passing through the center of $i$. The axle $i_5$ revolves in bearings $i_6$ arranged at the horizontal framework $T_3$ of the machine. The reel I is rotated by means of the gear wheel $i_7$ fixed to the axle $i_5$ and meshing with the idler $u_{13}$ rotating aroung the lug $u_{14}$ fixed to the frame $T_4$ and meshing with the gear wheel $u_{15}$ attached to the driving shaft $u_2$ of the machine on the side opposite to the driving pulley, (Fig. 5).

The bottom plate K fits loosely into the channel formed by the face $i_1$ and the sides $i_2$ of the reel I and, following in outline the circumference of the lower half of the latter, is the stationary bottom of the molding or loaf shaping channel of the machine. At the inlet side for the dough to the channel the bottom plate K is connected by means of the cross bar $k$ with the intermediate plate M made of thin flexible steel, and at the outlet side for the dough from the channel by means of the cross bar $k_1$ with the outlet plate N made of the same material as M. (Fig. 6 and Fig. 7.)

The inlet plate L has nearly the width of the molding channel, fitting loosely into the same, and is curved following the circumference of the reel; it is fixed to the framework $T_4$ by means of the screw studs $l$ and $l_1$ arranged at each side of the plate. (Fig. 8.)

The inlet plate L ends in the knife-like edge $l_2$ between which and the cross bar $m$ arranged at the framework $T_4$ the intermediate plate M is able to slide, following the movements of the bottom plate K. The cross bar $m$ is provided with the lugs $m_1$ nearly touching the rim $i_2$ of the reel, in order to prevent any side slip of the plate M. Fig. 6 shows the latter and the bottom plate in two different positions fully explaining the working of the arrangement just described.

The rack devices (Fig. 9) O and $O_1$ serve to adjust the sides, and the rack devices $O_2$ the lowest point of the bottom plate K. The guide blocks $o$ are the same for all these devices, while the bearer bars $o_1$ which with the guide blocks $o$ form the immediate support of the bottom plate K, differ from each other, the bars $o_1$ belonging to the side devices O and $O_1$ being provided with slots $o_4$ (Fig. 13) to give some play to the guide rods $o_2$ of the guide blocks $o$, while the bearer bar $o_1$ belonging to the bottom device has closely fitting openings $o_5$ (Fig. 14) in which the guide rods $o_2$ move like in a stuffing box.

The guide rods $o_2$ for the sides of the bottom plate K are horizontal and slide in slots giving vertical play, while those arranged at the lowest point of K are vertical and slide in tight vertical openings. The guide rods $o_2$ are provided with stop plates $o_3$ (Fig. 12) against which the bearer bars $o_1$ are pressed by the weight P (Fig. 1).

The bearer bars $o_1$ employed at the sides of the bottom plate K are fixed at one end to the sliding rack block $o_6$ and at the other end to the sliding rack block $o_7$. The rack blocks $o_6$ and $o_7$ move in channels formed by the back blocks $o_9$ and $o_{10}$ securely fastened to the legs T, respectively $T_1$, of the framework of the machine, and by the stop blocks $o_{12}$ and $o_{13}$. These channels slant upward toward the bottom plate K, so that, when the rack blocks are moved in the channels upward and toward the bottom plate K, the latter is lifted while its distance from the face $i_1$ of the reel I is diminished, and that when the rack blocks are moved downward and away from the bottom plate K, the latter is lowered, while the distance between same and the face $i_1$ is increased.

The angle which the line in which the rack blocks move, forms with the horizontal line, is a function of the diameter of the circle the bottom plate is part of, and of the required limits of the adjustment of the bottom plate K in regard to the face $i_1$ of the reel I.

The teeth $o_{15}$ and $o_{16}$ of the rack blocks $o_6$ and $o_7$ mesh with the teeth of the pinions $o_{18}$ and $o_{19}$ fixed to the common shaft $o_{21}$ on one side and the common shaft $o_{22}$ on the opposite side of the bottom plate K. These shafts are rotated in bearings $o_{24}$ and $o_{25}$ arranged in the legs T and $T_1$ of the framework of the machine and bear at the part situated outside the same, bevel wheels $o_{27}$ and $o_{28}$ meshing with the bevel wheels $o_{30}$ and $o_{31}$ both of which are fixed to the shaft $o_{33}$, turned by means of the hand wheel $o_{35}$ in bearings carried by brackets $o_{34}$ fixed to the legs T and $T_1$ of the machine. The bevel wheels $o_{30}$ and $o_{31}$ are arranged on the shaft $o_{33}$ in such a manner that they work in opposite direction to each other turning the pair of pinions $o_{18}$ and $o_{19}$ situated at one side of the bottom plates K in opposite direction to the other pair situated at the opposite side; thus, the sides of the bottom plate K are moved to or from its center and lifted at the same time by simply turning the hand wheel $o_{35}$.

The bearer bar $o_1$ holding the lowest point of the bottom plate K is fixed to the pair of rack blocks $o_8$ sliding in a vertical direction in the channels formed by the back blocks $o_{11}$ and the stop blocks $o_{14}$. The back blocks $o_{11}$ are attached to the center legs $T_2$ of the machine. The teeth $o_{17}$ of the rack blocks $o_8$ mesh with the pinions $o_{20}$ fixed to the common shaft $o_{23}$ which turns in the bearings $o_{26}$ arranged in the legs $T_2$ of the framework of the machine and carries at the same side of the latter at which the shaft $o_{33}$ and hand wheel $o_{35}$ are attached, the bevel wheel $o_{29}$ meshing with the bevel wheel $o_{32}$ fixed to the shaft $o_{36}$ turning in bearings of the supports $o_{37}$ attached to the legs $T_1$ and $T_2$ of the machine. The shaft $o_{36}$ is provided at its upper end with the bevel wheel $o_{38}$ meshing with the bevel wheel $o_{39}$ fixed to the shaft $o_{33}$ so that by turning the hand wheel $o_{35}$ also these bevel wheels and pinions are moved, and thereby the bottom bearer bar $o_1$ and the lowest point of the bottom plate K are adjusted in a vertical direction.

In the construction shown in the drawings, the bevel wheels $o_{27}$, $o_{28}$, $o_{29}$, $o_{30}$, $o_{31}$, $o_{32}$, $o_{38}$ and $o_{39}$ are arranged so that the shafts $o_{21}$, $o_{22}$ and $o_{23}$ they simultaneously drive when the hand wheel $o_{35}$ is turned, revolve with exactly the same velocity and that the two side pairs of pinions $o_{18}$ and $o_{19}$ fixed to the shafts $o_{21}$ and $o_{22}$ are so much smaller than the bottom pair of pinions $o_{20}$ fixed to the shaft $o_{23}$ that by means of the rack $o_6$ and $o_7$ the two bearer bars $o_1$ of the side adjustments O and $O_1$ and thereby the sides of the bottom plate K are moved in relation to the face $i_1$ of the reel I to the same degree as by means of the rack $o_8$ the bearer bar $o_1$ of the bottom adjustment $O_{21}$ and thereby the lowest point of the plate K. In this way the distance between the face $i_1$ of the reel I and the bottom plate K remains the same at all points at any position of the latter.

If it is desired that this distance can be adjusted differently at different points, then the above named bevel wheels and pinions must be constructed and arranged accordingly.

In the weight arrangement P keeping the bottom plate K in position by pressing it with the guide blocks $o$ and the stops $o_3$ against the bearer bars $o_1$, two wires $p$ pass underneath the bottom plate K along each side of same in the ruts $o_{40}$ (Fig. 12) provided in the guide blocks $o$; at one side of the machine the two wires travel upward over the grooved pulleys $p_1$ and $p_2$ and then downward, where the ends are connected to the pair of hooks $p_3$ arranged at the sides of the top of the weight P and at the other side of the machine the two wires run over the grooved rolls $p_4$ and $p_5$ and are fastened to the pair of hooks $p_6$ at the top of the weight P. The resiliency of the bottom plate K can be altered by altering the weight P.

In this arrangement the middle part connecting the two guide rods $o_2$ of the guide blocks $o$ is a simple straight bar as is also the middle part of the bearer bars $o_1$ (Fig. 12).

The outlet plate N (Fig. 7 and Fig. 8) connected by the crosspiece $k_1$ to the bottom plate K as already mentioned above, has an upward pointing part $n$ which forms the end part of the molding channel, and is bent over at the top $n_1$ for the ready molded loaf of dough to slip easily over same onto the outlet chute R. At its upper part the outlet plate N is provided with two studs $n_2$ carrying the cross bar $n_3$ sliding in the slots $t_5$ arranged in the framework $T_5$. This cross bar $n_3$ supports two hinges $r$ attached to the outlet chute R which consists of a straight iron plate provided at each side with a rim $r_1$ to guide the dough loaf onto the conveyer S. The chute R is provided at its lower side with brackets $r_2$ carrying the cross bar $r_3$ sliding in the slots $t_6$ arranged in the framework $T_5$. By means of the rod $n_3$ and the slots $t_5$, the top $n_1$ of the outlet plate N is always kept in its proper position above the chute R while moving upward or downward with the bottom plate K, the chute R following these movements at the same time.

The roller $s$ of the belt conveyer S (Fig. 4) rotates around its axle $s_1$, running in bearings $s_2$ provided on the horizontal part $T_3$ of the framework, and is driven by means of the sprocket wheel $s_3$ attached to the axle $s_1$, and the chain $u_{16}$ from the sprocket wheel $i_8$ fixed to the axle $i_5$ of the reel I.

For operating the machine, at first the different parts of the same must be adjusted according to the weight, size and qualities of the pieces of dough to be molded and to the size and shape of the ready molded loaf to be obtained from the piece of dough placed into the machine. In the machine shown in the drawings, the distances of the two pairs of rollers, B and $B_1$, and $B_2$ and $B_3$, are regulated by turning the hand wheels $d_7$ belonging to their adjustment arrangements, and the resiliency of the upper rollers $B_1$ and $B_3$ is adjusted by turning the screws $e$ belonging thereto. The folding member G is adjusted by means of the screws $g_2$ and $g_3$. The size of the molding channel is regulated by turning the hand wheel $o_{35}$, and the resiliency of the bottom plate K by altering the weight P.

The pieces of dough to be shaped into loaves are then placed, one after the other, into the hopper A from which they enter the sheeting apparatus; they are rolled out to a sheet between the rollers B and $B_1$, and $B_2$ and $B_3$; the resulting sheets are folded up into cylindrical rolls by means of the folding roller H and folding member G and pass then over the inlet plate L into the funnel-like passage formed by the lower part of the plate L and the intermediate plate M with the face $i_1$ of the rotating wheel I and from there into the molding channel proper formed by the latter and the stationary resilient bottom plate K. The ready-shaped loaves of dough leave then through the upper part of the molding channel formed by the face $i_1$ of the reel and the outlet plate N, and drop over the top $n_1$ of the latter onto the chute R and the conveyer S which takes them to their destination.

I claim:

1. In a dough molding machine, in combination with rotary rollers adapted to roll out the dough to a sheet, a folding member curved on its surface toward the passing sheet of dough convex in its upper and concave in its lower part, and a folding roller, rotating quicker than the sheeting rollers, both, the folding member and roller being so arranged underneath the sheeting rollers and in regard to each other, that the sheet of dough leaving the sheeting rollers, meets on its nearly perpendicular downward passage the folding roller just above its center, is driven by same into the concavity of the folding member and thereby folded up into a roll which then drops by its own gravity from the folding roller into the molding channel of the machine.

2. In a dough molding machine, the combination with rotary rollers adapted to roll out the dough to a sheet, of means consisting of screw rods and bevel gearing for adjusting the distance between each pair of such rollers, resilient means consisting of adjustable springs pressing on the movable rollers for keeping this distance, a folding member curved on its surface turned toward the passing sheet of dough, convex in its upper and concave in its lower part, means consisting of screw studs, fixed to the said member and of slots provided in the framework of the machine for adjusting the position of the folding member, and a folding roller revolving toward the concavity of the folding member and quicker than the sheeting rollers, the folding member and the folding roller being so arranged underneath the latter and in regard to each other, that the sheet of dough leaving the sheeting rollers meets on its nearly perpendicular downward passage the folding rollers just above its center, is driven by same into the concavity of the folding member and thereby folded up into a roll.

3. In a dough molding machine, the combination with a rotary reel of rims provided thereon, a non-revolving bottom plate fitting loosely into the space between the said rims of the said reel, following the lower half of its circumference and forming as bottom with same the molding channel, a stationary curved inlet plate fixed to the framework of the machine, convex in its upper part and following the circumference of the reel in its lower part, so as to facilitate the entrance of the rolled pieces of dough into the molding channel, a flexible, intermediate plate fixed at its lower end to the top of the bottom plate and moving at its upper part loosely between the lower edge of the inlet plate and a rod attached to the framework of the machine, thus forming at any position of the bottom plate a funnel-like entrance into the molding channel, means consisting of racks for adjusting the depth of this channel, and resilient means worked by a weight for keeping this depth.

4. In a dough molding machine, the combination with a rotary reel of rims provided thereon, and a non-revolving bottom plate fitting loosely into the space between the said rims of the said reel and forming as bottom with same the molding channel, a stationary curved inlet plate fixed to the framework of the machine and constructed so as to facilitate the entrance of the dough into the molding channel, a flexible, intermediate plate fixed at its lower end to the top of the bottom plate and moving at its upper part loosely between the lower edge of the stationary inlet plate and a rod attached to the framework of the machine, a flexible outlet plate fixed at its lower end to the upper part of the bottom plate opposite to the inlet plate, and provided with a turned-over top so as to facilitate the exit of the ready molded loaves of dough from the molding channel, a rod fixed across the back to the upper part of the outlet plate, the protruding ends of this rod moving in slots so arranged in the framework of the machine that the width of the outlet for the dough between the face of the rotating reel and the top of the outlet plate remains always the same at any position of the bottom plate, means consisting of racks for adjusting the depth of the molding channel and resilient means worked by a weight for keeping this depth.

5. In a dough molding machine comprising rotary adjacent rollers adapted to roll out the dough to a sheet, means consisting of screw rods with stops and bevel gearing for adjusting the distance between each pair of such rollers, resilient means consisting of adjustable springs for keeping this distance, a curved adjustable folding member, a folding roller revolving toward the concavity of the folding member and quicker than the sheeting rollers, and arranged so in regard to the latter and to the folding member that the sheet of dough coming from the former is driven into the concavity of the latter and thus rolled up, a rotary reel having sides, and a plate fitting loosely between the said sides of the reel and forming with its face and sides the molding channel, means consisting of racks for adjusting the distance of this plate from the face of the reel, and resilient means worked by a weight to keep this distance.

6. In a dough molding machine comprising adjustable and resilient rollers adapted to roll out the dough to a sheet, a curved plate, a roller rotating toward the concavity of the curved plate and arranged so that the dough sheet leaving the sheeting rollers meets it just above its center and is then thrown into the concavity of the curved plate and folded up, a rotary reel having rims and a stationary resilient bottom plate fitting into the space between the said rims of the reel and forming with same and its face the molding channel, a curved, immovable inlet plate fixed to the framework of the machine and so constructed and arranged as to facilitate the entrance of the folded up roll of dough into the molding channel, a flexible intermediate plate fixed to the top of the bottom plate and connecting loosely the bottom and the inlet plate, a flexible outlet plate fixed to the upper part of the bottom plate opposite the inlet plate and provided with a turned over top, means consisting of racks for adjusting the distance of the bottom plate from the face of the reel, resilient means for keeping this distance, the resiliency of which means is adjustable, and means for allowing the intermediate and the outlet plate to follow the movements of the bottom plate without impairing their functions.

7. In a dough molding machine the combination with a pair of adjacent rollers, of a stationary frame carrying the axle of one roller, a movable block carrying the axle of the other roller, projections provided in the stationary framework at each side of the roller and containing female threads, guide rods arranged at each side of the rollers and provided with threads fitting into the female threads of the projections, stops arranged at the guide rods between the stationary framework and the movable block, bevel wheels arranged at the ends of the guide rods protruding over the stationary frame opposite to the bearings of the roller axle carried by same, bevel wheels meshing with these bevel wheels and fixed at a common axle, a hand wheel turning this axle, springs arranged at that part of the guide rods protruding above the movable block, screw threads arranged at the same ends of the guide rods and screw nuts fitting over same and pressing the springs against the movable block resting on the stops of the guide rods.

8. In a dough molding machine, the combination with a rotary reel, of a plate loosely fitting into the annular channel of said reel and following the outline of its lower half, a framework consisting of a horizontal part carrying the axle of the reel and three pairs of legs carrying the horizontal part, racks fixed to these legs, pinions working same and attached to axles rotatable in bearings arranged in the legs of the framework, bevel wheels fixed to these axles, bevel wheels meshing with the said bevel wheels and fixed to a common shaft, a hand wheel working this shaft and thus simultaneously the pinions and their racks, and bars connecting the said racks with the plate situated in the annular channel of the reel in such a manner that the plate follows the movements of the racks.

9. In a dough molding machine, the combination with a rotary reel, of a bottom plate fitting loosely into the channel thereof and following in circumference its lower half, two pairs of inclined racks one for each side of the said plate, sliding blocks slanting upward toward the latter and fixed to the outer legs of the machine, one pair of vertical racks for the lowest point of the said bottom plate, sliding in vertical blocks fixed to the middle pair of legs of the machine, means connecting the three pairs of racks with the bottom plate, three pairs of pinions working the racks, one for each pair of racks, three shafts connecting the pinions, one for each pair, and means for simultaneously rotating the said shafts and pinions and thereby working the racks and adjusting the bottom plate in regard to its distance from the face of the reel.

10. In a dough molding machine comprising adjustable and resilient rollers adapted to roll out the dough to a sheet, a curved plate, a roller rotating toward the concavity of this curved plate and arranged so that the dough sheet leaving the sheeting rollers meets it just above its center and is then thrown into the concavity of the curved plate and folded up, a rotary reel provided with rims, a stationary resilient bottom plate fitting into the space between the said rims of the reel and forming with same and its face the molding channel, a curved immovable inlet plate fixed to the framework of the machine and so constructed and arranged as to facilitate the entrance of the folded-up rolls of dough into the molding channel, a flexible intermediate plate fixed to the top of the bottom plate and connecting loosely the latter and the inlet plate, a flexible outlet plate fixed to the upper part of the bottom plate opposite to the inlet plate and provided with a turned over top, means consisting of racks for adjusting the distance of the bottom plate from the face of the reel, a weight arrangement for keeping this distance, and means for allowing the intermediate and the outlet plate to follow the movements of the bottom plate without the distance of the top of the intermediate and of the top of the outlet plate from the face of the reel being altered.

11. In a dough molding machine, the combination with a rotary reel, of a bottom plate fitting into the channel thereof, and thus forming the bottom of the molding channel, guide rods arranged at the said plate, pointing outward and provided with stops, adjustable bars stationary while the machine is at work, provided with openings for the guide rods to slide in and so arranged in regard to the latter that those parts containing the openings are situated between the stops of the guide rods and the bottom plate, racks carrying the said bars, fixed to the framework of the machine and adapted simultaneously to adjust the said bars and thereby the depth of the molding channel, a weight, and wires carrying same and running along the outside of the bottom plate, the latter, the weight and the wires being arranged so that the weight presses the stops of the guide rods against the bars in the openings of which these rods slide.

12. In a dough molding machine the combination with a rotary reel, of a bottom plate fitting loosely into the channel of the reel and forming with its face and side walls protruding over same the molding channel, a stationary curved inlet plate fixed at the entrance of the dough into the molding channel to the stationary frame of the machine and ending at the part pointing toward the bottom plate in a knifelike edge, a flexible intermediate plate fixed to the bottom plate and extending behind the knifelike end of the inlet plate, and a rod fixed to the framework of the machine at such points that the free end of the intermediate plate extending behind the inlet plate is pressed against the knifelike edge forming its lower end, thus forming at all positions of the bottom plate a bridge between this plate and the inlet plate and a funnel like entrance into the molding channel.

13. In a dough molding machine, the combination with a rotary reel, of a bottom plate fitting loosely into the channel of the said reel and forming with the face and side walls of the latter the molding channel, a flexible outlet plate fixed to the bottom plate at the outlet for the dough from the molding channel and curved at its top so as to facilitate the dough dropping over same, two lugs attached to the outlet plate just underneath its turned-over top, a cross bar carried by the said lugs, two slots arranged for the said cross bar to slide in at such points of the framework of the machine that, while the outlet plate follows the movements of the bottom plate, the distance of the top of the former from the face of the reel remains always the same, a chute slanting downward from underneath the turned over top of the outlet plate, two lugs attached to the underside of the chute, a cross bar carried by the said lugs, two hinges fixed at the top part of the chute and turning round the cross bar arranged at the outlet plate and slots provided in the framework of the machine for the cross bar of the chute to slide in for allowing same to follow the movements of the top of the outlet plate.

14. In a dough molding machine, the combination with a rotary reel, of a bottom plate fitting loosely into the channel of the reel and forming with the face and side walls of the latter the molding channel, racks for adjusting the position of the bottom plate in regard to the face of the reel, a curved inlet plate fixed at the entrance of the dough into the molding reel by bolts to the frame of the machine and ending at the part pointing toward the bottom plate in a knifelike edge, a flexible intermediate plate fixed to the bottom plate and extending behind the knifelike end of the inlet plate, a rod fixed to the frame of the machine just behind the inlet plate at such points that the free end of the intermediate plate is pressed against the knifelike end of the former, sliding freely behind same, a flexible outlet plate attached to the bottom plate at the outlet for the dough from the molding channel and turned over at its top, so as to facilitate the dough dropping over same, two lugs attached to the outlet plate closely underneath its top, a cross bar carried by these lugs and two slots arranged for the cross bar to slide in at such points of the frame of the machine as to enable the outlet plate to follow the movements of the bottom plate without alteration in the distance of the top of the outlet plate from the face of the reel.

15. In a dough molding machine, the combination with the roller B and $B_2$ rotating with their axles $b$ and $b_9$ in bearings $b_1$ and $b_{10}$ fixed to the framework $T_4$ and the rollers $B_1$ and $B_3$ rotating with their axles $b_2$ and $b_{11}$ in bearings $b_3$ and $b_{12}$ fixed to the movable blocks $b_4$ and $b_{13}$, of guiderods $d$ arranged one at each side of the two pairs of rollers, B and $B_1$ and $B_2$ and $B_3$, working together to roll out dough to a sheet, screw threads $d_1$ provided on the rods $d$, projections $t$ on the inside of the frame $T_4$, female threads $t_1$ provided in these projections for the screw threads $d_1$ of the rods $d$ to turn in, bevel gearings $D_3$ adapted to turn simultaneously and evenly the rods $d$ at each side of the rollers B and $B_1$, and $D_5$ adapted to turn simultaneously and evenly the rods $d$ at each side of the rollers $B_2$ and $B_3$, stops $d_2$ arranged at the rods $d$ to carry the movable blocks $b_4$ and $b_{13}$, springs E and $E_1$ pressing the movable blocks $b_4$ and $b_{13}$ down on the stops $d_2$ belonging thereto, screw nuts $e$ turning on the screw threads $d_{10}$ provided at the ends of the guide rods $d$, for adjusting the springs E and $E_1$, substantially as shown.

16. In a dough molding machine, the combination with the sheeting rollers $B_2$ and $B_3$, of the folding member G having a convex upper part $g$ loosely fitting between the side plates $b_8$ of the roller $B_2$ and a concave lower part $g_1$, screw lugs $g_2$ and $g_3$ provided at each side of the member G, slots $t_3$ and $t_4$, arranged in the framework $T_4$ for the lugs $g_2$ and $g_3$ to slide in, when the member G is to be adjusted, and the folding roller H, rotating with its axle $h$ in bearings $h_1$ fixed to the framework $T_4$, in such a direction, that the dough sheet coming from between the rollers $B_2$ and $B_3$ is driven thereby into the concavity $g_1$ of the folding member G, substantially as shown.

17. In a dough molding machine, the combination with the molding channel formed by the face $i_1$ and sides $i_2$ of the reel I and the bottom plate K, the curved inlet plate L provided at each side with two screw lugs $l$ and $l_1$ and fixed thereby to the framework $T_4$, and having a knifelike lower edge $l_2$, a flexible plate M fixed at its lower end by the cross bar $k$ to the bottom plate K, the cross rod $m$ so arranged at the framework $T_4$ that the upper part of the plate M is loosely pressed by same against the back of the edge $l$ of the plate L, and the lugs $m_1$ fixed to the rod $m$ for preventing any side slip of the plate M, substantially as shown.

18. In a dough molding machine, the combination with the molding channel formed by the face $i_1$ and the sides $i_2$ of the reel I and the bottom plate K, of three blocks $o$ fixed, one to each side and one to the middle of the plate K, guide rods $o_2$ pointing outward, one at each end of the guide blocks $o$, stop plates $o_3$ attached to the ends of the guide rods $o_2$, three bearer bars $o_1$ each provided with two slots, the slots $o_4$ in the side- and the slots $o_5$ in the bottom bearer bars, for the guide rods $o_2$ to slide in, a weight P pressing by means of the wires $p$ the stop plates $o_3$ against the bearer bars $o_1$, three pair of racks fixed to the framework of the machine and carrying the bearer bars $o_1$, the two pair of racks carrying the side bearer bars $o_1$ consisting of the racks $o_6$ and $o_7$ inclined toward the reel I, and the pair of racks carrying the middle bearer-bar $o_1$ consisting of the vertical racks $o_8$, $o_8$, and the pinions $o_{18}$, $o_{19}$, and $o_{20}$ working these racks respectively for adjusting the distance of the plate K from the face $i_1$ of the reel I, substantially as shown.

19. In a dough molding machine, the combination with the molding channel formed by the face $i_1$ and the sides $i_2$ of the reel I and the bottom plate K, of the flexible outlet plate N having an upright part $n$ and a turned-over top $n_1$, provided with the lugs $n_2$ carrying the cross bar $n_3$ sliding in slots $t_5$ arranged in the frame $T_5$ of the machine, and the chute R consisting of the solid plate $r$ and the upright side walls $r_7$, provided with the lugs $r_2$ carrying the cross bar $r_3$ sliding in the slots $t_6$ of the frame $T_5$, the slots $t_7$ and $t_6$ being so arranged therein, that the top $n_1$ of the outlet plate N always keeps the same distance from the face $i_1$ of the reel I, while the outlet plate N and the chute R follow the movements of the bottom plate K, substantially as shown.

20. A dough molding machine comprising a feed hopper, rotary rollers arranged in pairs and adapted to roll out the dough fed thereto into a sheet, a stationary frame carrying the lower set of rollers, movable blocks for each roller belonging to the upper set, guide rods adapted for these blocks to slide on and adjustably arranged at the stationary frame carrying the machine, stops provided on the guide rods to hold the movable blocks, springs fitting on the guide rod ends protruding over the blocks and pressing them against the said stops, stationary plates leading the dough sheet from one pair of rollers to the successive one, a curved plate situated underneath the last pair of rollers, a quickly rotating roller adjacent to this plate and revolving toward its concavity, thus folding up the sheet into a roll, a stationary curved plate adapted to lead the roll of dough produced into the final molding channel, a rotary reel, a plate fitting into the annular channel of said reel, and following the lower half of its circumference and forming with it the molding channel, a flexible plate fixed thereto and sliding behind the plate leading the dough into the channel, guide rods arranged at the main-plate of the molding channel pointing outward and provided with stops, bars provided with openings for the said guide rods to slide on, racks carrying the said bars, pinions working the racks, bevel gearing working the pinions simultaneously, a weight, wires carrying same running along the outside of the plate forming the molding channel and so arranged as to press the stops of the said guide rods against the bars in the openings of which these rods slide, a flexible plate fixed to the plate forming the bottom of the molding channel at its outlet end and having a turned over top, and a chute receiving the dough from over the top of the latter plate and movably connected to same, both plates being provided with means to follow together the movements of the plate forming the bottom of the molding channel.

21. A dough molding machine comprising the feed hopper A, the brake rollers B, $B_1$, $B_2$ and $B_3$, the bridge plate C, the adjustment devices D, $D_1$, $D_2$ and $D_4$, the bevel gearings $D_3$ and $D_5$ working the said devices, the spring devices E and $E_1$, the folding member G, the folding roller H, the rotary reel I, the bottom plate K, the inlet plate L, the intermediate plate M, the outlet plate N, the rack adjustment devices O, $O_1$ and $O_2$, the weight arrangement P and the chute R, substantially as shown and described.

LOUIS CHARLES REESE.

Witnesses:
J. RAY ABBEY,
MORRIS L. JOHNSTON.

Copies of this patent may be obtained for five cents each, by addressing the "Commissioner of Patents, Washington, D. C."